US012320194B2

(12) United States Patent
Geiger

(10) Patent No.: US 12,320,194 B2
(45) Date of Patent: Jun. 3, 2025

(54) ASSEMBLY FOR MOUNTING SHADES

(71) Applicant: GeigTech East Bay LLC, North Charleston, SC (US)

(72) Inventor: James Geiger, Charleston, SC (US)

(73) Assignee: GeigTech East Bay LLC, North Charleston, SC (US)

( * ) Notice: Subject to any disclaimer, the term of this patent is extended or adjusted under 35 U.S.C. 154(b) by 174 days.

(21) Appl. No.: 17/856,351

(22) Filed: Jul. 1, 2022

(65) Prior Publication Data

US 2022/0333439 A1 Oct. 20, 2022

Related U.S. Application Data

(63) Continuation of application No. 17/211,617, filed on Mar. 24, 2021, now Pat. No. 11,377,903, which is a continuation of application No. 16/543,534, filed on Aug. 17, 2019, now Pat. No. 10,988,982, which is a continuation of application No. 16/035,079, filed on Jul. 13, 2018, now Pat. No. 10,415,307, which is a continuation of application No. 15/994,687, filed on May 31, 2018, now Pat. No. 10,294,717, which is a (Continued)

(51) Int. Cl.
*E06B 9/50* (2006.01)
*A47H 1/13* (2006.01)

(52) U.S. Cl.
CPC *E06B 9/50* (2013.01); *A47H 1/13* (2013.01)

(58) Field of Classification Search
CPC .................................... E06B 9/50; A47H 1/13
See application file for complete search history.

(56) References Cited

U.S. PATENT DOCUMENTS 11,957,261 B2 * 4/2024 Giri ............................ E06B 9/58
2010/0236891 A1 * 9/2010 Lagarde .................. F16D 67/00
192/223.4

(Continued)

FOREIGN PATENT DOCUMENTS

EP 2357309 A1 8/2011
WO 2013052084 A1 4/2013

OTHER PUBLICATIONS

Judge McMahon, United States District Judge, Southern District of New York, Claim Construction Decision, May 5, 2022, pp. 23.

*Primary Examiner* — Anita M King
(74) *Attorney, Agent, or Firm* — Kim and Lahey Law Firm, LLC; Douglas W. Kim

(57) ABSTRACT

A roller shade mounting element comprising: a bracket having a first end configured to couple to a support surface and configured to support a roller window shade assembly; a first surface carried by the first end configured to bear against the support surface; a second end included in the bracket substantially opposite the first end; a second surface carried by the second end disposed between the first end and the second end, the second surface configured to support an end of the roller window shade assembly; and a member coupled with the bracket and configured to engage the roller window shade assembly, and the member configured to limit rotation of at least a portion of the roller window shade assembly; and, wherein the combination of the bracket and the roller window shade assembly completely obscures at least a portion of the bracket to an observer.

19 Claims, 18 Drawing Sheets

Related U.S. Application Data continuation-in-part of application No. 14/997,211, filed on Jan. 15, 2016, now Pat. No. 9,988,839, which is a continuation-in-part of application No. 14/401,453, filed as application No. PCT/US2013/041175 on May 15, 2013, now Pat. No. 9,237,821.

(60) Provisional application No. 61/647,445, filed on May 15, 2012.

(56) References Cited

U.S. PATENT DOCUMENTS

| | | | | |
|---|---|---|---|---|
| 2013/0199735 | A1* | 8/2013 | Colson | E06B 9/80<br>160/84.02 |
| 2014/0224437 | A1* | 8/2014 | Colson | E06B 9/78<br>160/311 |
| 2018/0310745 | A1* | 11/2018 | Giri | E06B 9/72 |

* cited by examiner

ASSEMBLY FOR MOUNTING SHADES

CROSS-REFERENCE TO RELATED APPLICATIONS

The present application is a continuation of U.S. patent application Ser. No. 17/211,617 filed Mar. 24, 2021 (now U.S. Pat. No. 10,988,982) which is a continuation of U.S. patent application Ser. No. 16/543,534 filed Aug. 8, 2019 (now U.S. Pat. No. 10,415,307) which is a continuation of U.S. patent application Ser. No. 16/035,079 filed Jul. 7, 2018 (now U.S. Pat. No. 10,415,307) which is a continuation of U.S. patent application Ser. No. 15/994,687, filed on May 31, 2018 (U.S. Pat. No. 10,294,717) which is a continuation of U.S. patent application Ser. No. 14/997,211 (now U.S. Pat. No. 9,988,839) filed on Jan. 15, 2016 which is a continuation-in-part of U.S. patent application Ser. No. 14/401,453, filed on May 15, 2013 (now U.S. Pat. No. 9,237,821) which is a U.S. national stage of and claims priority to and the benefit of International Application No. PCT/US2013/041175, filed on May 15, 2013, which claims priority to and the benefit of U.S. Provisional Patent Application No. 61/647,445, filed on May 15, 2012, each of which are incorporated herein by reference in their entirety and for all purposes.

FIELD

The present invention relates to fastening devices such as mounts, brackets, bracket assemblies, and mounting systems for the installation of motorized shades and shade systems.

BACKGROUND

Current brackets and mounts for roller window shades and shade systems are typically bulky, visible, and may detract from the aesthetics of the shade system. Hence, there remains a need for improved assembly for mounting shades and shade systems, including motorized shades.

SUMMARY

The present embodiments provide for a system of fastening devices, e.g., mounts, brackets, and assemblies for installing roller window shades. The roller shade mounting element can include a bracket having a first end configured to couple to a support surface and configured to support a roller window shade assembly; a first surface carried by the first end configured to bear against the support surface; a second end included in the bracket substantially opposite the first end; a second surface carried by the second end disposed between the first end and the second end, the second surface configured to support an end of the roller window shade assembly; and a member coupled with the bracket and configured to engage the roller window shade assembly, and the member configured to limit rotation of at least a portion of the roller window shade assembly; and, wherein the combination of the bracket and the roller window shade assembly completely obscures at least a portion of the bracket to an observer.

The first surface of the bracket can be a first flat support surface, wherein the first end comprises a second flat support surface configured to bear against the support surface, and wherein the first flat support surface and the second flat support surface are coplanar when the roller shade mounting element is installed. The first end can comprise at least two apertures, and wherein each aperture is configured to receive a fastener to couple the first end to the support surface. The bracket can further define a third surface at the second end, and wherein the third surface is rounded. The second surface can extend perpendicular to the first surface. The member can comprise an opening configured to receive one end of the roller window shade assembly. The member can comprise a protrusion.

The roller shade mounting system can include a mount plate configured to couple to a support surface; a bracket carried by the mount plate configured to support a first roller window shade assembly; a first end included in the bracket; a second end included in the bracket substantially opposite the first end; a first surface included in the first end configured to bear against the support surface; a second surface between the first end and the second end, the second surface configured to extend adjacent an end of the roller window shade assembly; a member coupled with the bracket, the member extending outward from the second surface, the member configured to engage the first roller window shade assembly, and the member configured to limit rotation of at least a portion of the first roller window shade assembly; and, wherein the bracket and the mount plate are configured such that when the mount plate is coupled to the support surface, the combination of the bracket and the window roller shade assembly completely obscures a view of at least a portion of the mount plate to an observer. The member can comprise at least one of an opening, a key and a protrusion. The member can be first member, the bracket can further comprising a second member; and, wherein the bracket further defines a third surface extending between the first end and the second end and positioned opposite the second surface, and wherein the second surface is configured to support a second roller window shade assembly; and, wherein the second member is coupled with the bracket, wherein the second member extends outward from the third surface of the bracket, wherein the second member is configured to engage the second roller window shade assembly, and wherein the second member is configured to limit rotation of at least a portion of the second roller window shade assembly. At least one of the first member and the second member can comprise at least one of an opening, a key and a protrusion. The first surface of the bracket can be a first flat support surface, wherein the mount plate defines a second flat support surface configured to bear against the support surface, and wherein the first flat support surface and the second flat support surface are coplanar when the roller shade mounting system is installed. The mount plate can define at least two apertures, and wherein each aperture is configured to receive a fastener to couple the mount plate to the support surface. The bracket can further define a fourth surface at the second end, and wherein the fourth surface is rounded. The second surface and the third surface each can extend substantially perpendicular to the first surface.

The system for mounting a roller window shade assembly, can include two roller shade mounting elements, each mounting element comprising: a first surface configured to bear against a flat support surface, a second surface substantially opposite the first surface, and, a member configured to support an end of the roller window shade assembly; wherein each of the mounting elements are configured to be secured to a corresponding flat support surface such that the first surfaces of the mounting elements bear against the corresponding flat support surface; wherein the member of at least one of the mounting elements is configured to engage the roller window shade assembly to prevent rotation of at least a portion of the roller window shade assembly; and, wherein the roller window shade assembly completely obscures at least a portion of the second surface to an observer. The mounting elements can include an outer circumference of each mounting element that is visible when supporting the roller window shade assembly. Each of the mounting elements can have at least two apertures extending therethrough, each aperture configured to receive a corresponding fastener to secure to a corresponding mounting element to the flat support surface, and wherein, when holding the roller window shade assembly, the fasteners are at least partially obscured by the roller window shade assembly. The member of the at least one of the mounting elements can be configured to engage a tube shade clutch or a tube shade motor of the roller window shade assembly to prevent rotation of at least a portion of the tube shade clutch or the tube shade motor. The mounting elements can be disk-shaped, and wherein, when holding the roller window shade assembly, an outer circumference of each mounting element is visible In one embodiment, the fastening device system comprises two one-piece, disk-shaped mounting brackets, one for each end of a shade tube, wherein the mounting brackets are configured such that, in use, the outer circumference of the brackets are visible; the mounting means being largely hidden within the bracket or by the shade. In a particular embodiment, the fastening system is designed for use with motorized shades, wherein one mounting bracket is configured to key the shade motor, and one mounting bracket is configured to receive the idler pin.

Another embodiment provides for a two-piece "invisible mount" fastening device comprising a mounting plate and a bracket, each configured to receive a means to secure the bracket to the mounting plate; and, optionally, a securing means. In use, the bracket surrounds the mounting plate, obscuring it from view. In one embodiment, the fastening device is configured to receive two ends of opposing shade tubes (i.e., a shade coupler). In another embodiment, the bracket is configured with a "key" projection. In yet another embodiment, the bracket is configured to receive an idler pin.

Yet another embodiment provides for a system for mounting at least two tube shades comprising the mounting bracket system (i.e., two disk-shaped mounting brackets) and at least one "invisible mount" two-piece shade coupler fastening device. In a particular embodiment, at least one of the shades is motorized.

Another embodiment provides for a system for mounting at least two tube shades, comprising at least three two-piece "invisible mount" fastening devices. In a particular embodiment, at least one of the shades is motorized and the system comprises a motor mount fastening device, a idler mount fastening device, and at least one shade coupler.

DETAILED DESCRIPTION

Figure 1:
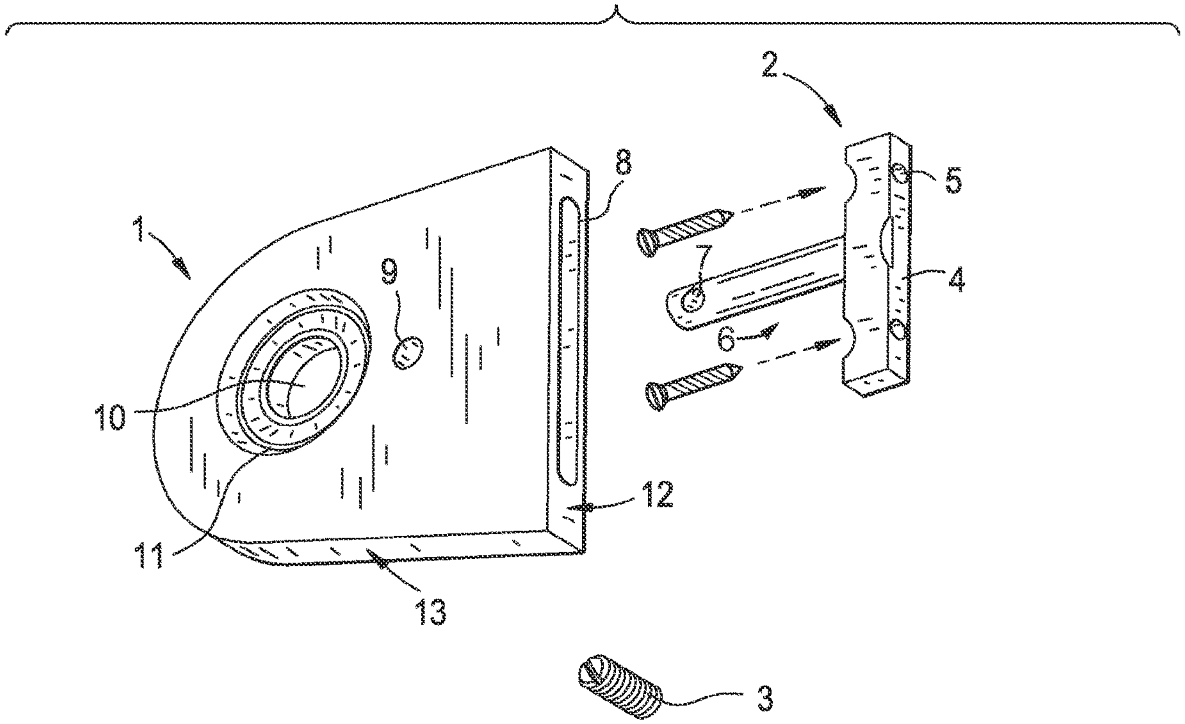
FIG. 1 shows a view of an example fastening device having a mounting plate, a bracket, and a set screw. Dashed lines indicate the direction of screws used to secure the mounting plate to a flat surface (e.g., a window casing or wall).

The present invention is not limited to the particular methodology, protocols, and expression of design elements, etc., described herein and as such may vary. The terminology used herein is for the purpose of describing particular embodiments only and is not intended to limit the scope of the present invention, which is defined solely by the claims.

As used herein and in the claims, the singular forms include the plural reference and vice versa unless the context clearly indicates otherwise. The term "or" is inclusive unless modified, for example, by "either." For brevity and clarity, a particular quantity of an item may be described or shown while the actual quantity of the item may differ. Other than in the operating examples, or where otherwise indicated, all numbers expressing measurements used herein should be understood as modified in all instances by the term "about," allowing for ranges accepted in the art.

All patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Unless defined otherwise, all technical terms used herein have the same meaning as those commonly understood to one of ordinary skill in the art to which this invention pertains. Although any known methods, devices, and materials may be used in the practice or testing of the invention, the methods, devices, and materials in this regard are described herein.

Embodiments of the present invention provide for improved means for mounting window shades (roller shades), including motorized shades, in which the portion of the mounting means (i.e., the "mount", "mounting plate", or "mounting bracket") affixed to the supporting structure (e.g., the window casing, walls, columns, etc.) are hidden from view by the structure of the bracket or mounting bracket. In some embodiments, the mounting bracket is a one-piece, disk-shaped device, having recessed apertures to receive means to secure the mounting plate, and further configured either to connect to the shade motor or clutch; or to hold a shade idler pin or pin. The disk-shape is selected for aesthetic reasons: to harmonize visually with the round nature of the shade tube, but other shapes of mounting plates are possible.

Another embodiment of the invention provides for a bracket, a mounting plate, and, optionally, a connecting means, whereby the bracket and mounting plate are configured such that, in use, the bracket fits over the mounting plate, being secured together by a connecting means, such that the mounting plate is hidden by the bracket. Optionally, the connecting means can be positioned on the body of the bracket at a location that will be hidden by the shade tube. The connecting means that secures the bracket to the mounting plate can comprise a pin and cam assembly, a set screw, a rod and spring, etc., as will be illustrated further by non-limiting embodiments herein.

The fastening devices of embodiments of the present invention can be made of any material suitable for being manufactured and capable of bearing the weight of shades, such as motorized shades. Such materials include metals, metal alloys, ceramics, plastics, and the like. The fastening devices can be manufactured by conventional processes.

Reference will now be made in detail to embodiments of the present invention, examples of which are illustrated in the accompanying drawings, wherein like reference numerals refer to the like elements throughout. The embodiments are described below to explain the present invention by referring to the figures.

An example embodiment of a fastening device for securing roller window shades to the desired wall, window casing, and the like, is shown in FIG. 1. The embodiment includes a bracket (1), mounting plate (2) and a set screw (3). The mounting plate (2) has one side or end adapted to abut a flat surface, and a peg (6) projects from the opposite side. The mounting plate (2) also bears two apertures (5) through which fastening means (e.g., screws) can be inserted as indicated by the dashed lines to secure the mounting plate to a flat surface. The peg (6) bears a screw bore (7) that passes through the entire peg and has an internally threaded surface for receiving the set screw. The bracket (1) is configured with an opening (8) to receive the mounting plate (2) and is configured to abut a flat surface. The bracket (1) also bears a screw bore (9) that passes through the entire body (i.e., width) of the bracket, for receiving the set screw. In the particular embodiment shown in FIG. 1, the bracket has an opening (10) for receiving one end of each of two opposing shade tubes, which tubes may interlock within the opening (10). The particular embodiment also has a bearing (11) within the opening (10), which allows the tubes to spin freely, minimizing friction and wear. Further regarding the bearing, this can be any appropriately sized commercially available bearing that, when the bracket is so configured, snaps into place. The bearing can be metal or ceramic, for example.

Figure 2:
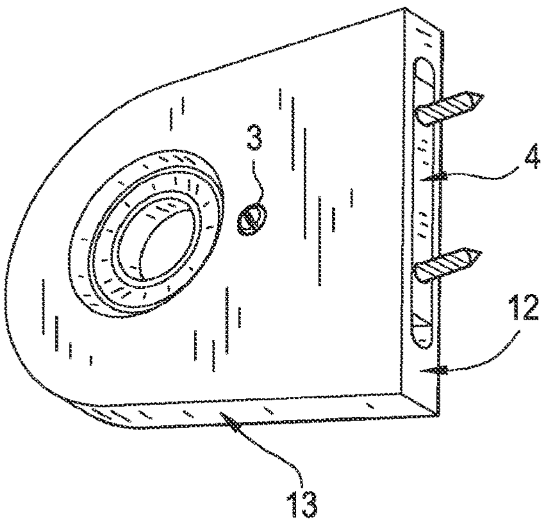
FIG. 2 shows the example embodiment of FIG. 1, with the bracket fitting over and around the mounting plate and the set screw inserted partially into the bracket.
Figure 3:
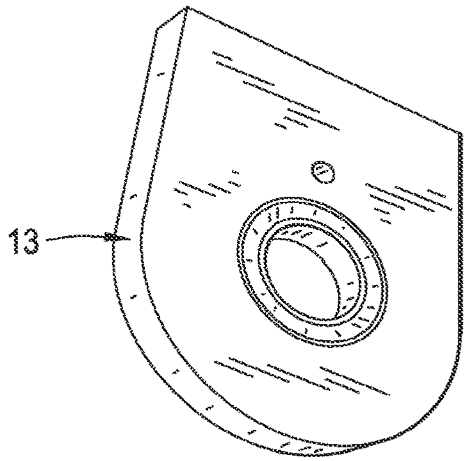
FIG. 3 shows a view of the installed embodiment of FIG. 1, wherein the outer circumference of the fastening device is visible, and the mounting plate is not visible, and the set screw is flush with the bracket.
Figure 9:
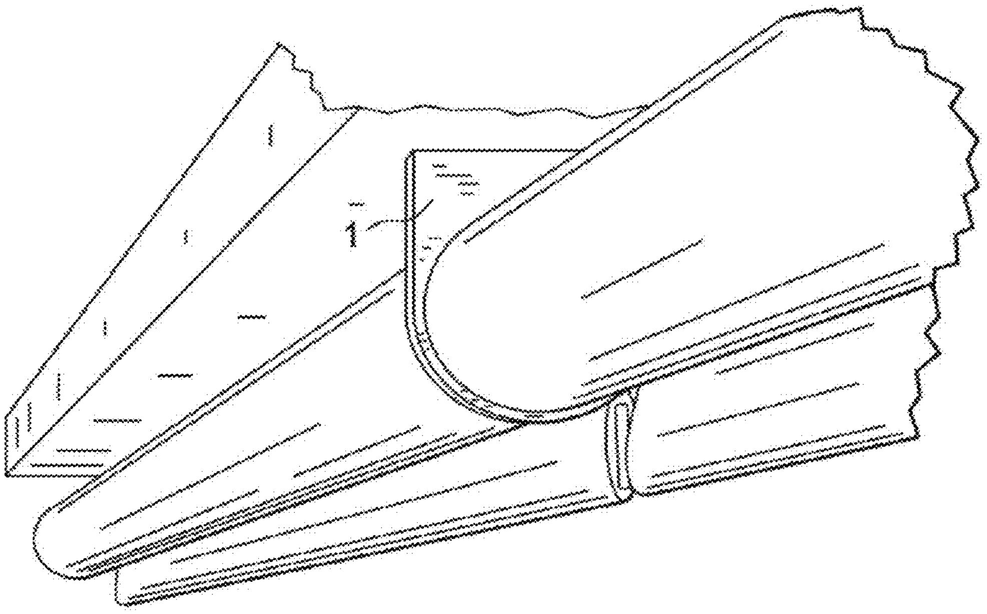
FIG. 9 is a perspective view of an embodiment of the fastening device configured as a Coupler, installed with two tube shades. Note that the set screw is obscured by the shade, leaving a clean, simple bracket in view.

In use, the mounting plate (2) is secured to a flat surface using screws or other appropriate fastening means that are inserted through the apertures (5) in the mounting plate (2) in the direction indicated by the dashed lines of FIG. 1. Once this the mounting plate (2) is secured, the bracket (1) is inserted over the mounting plate (2), such that the flat surfaces (4, 12) align, and the screw bores (7, 9) align. A view of this is shown in FIG. 2, which also shows the set screw (3) partially inserted into the bracket (1) screw bore (9). Once the bracket (1) is in place, the set screw (3) is then secured through the bore holes (7, 9) of the bracket (1) and peg (6). Note that the end (12) of the bracket and the flat surface (4) of the mounting plate align to create a flat surface that will evenly abut a complementary flat surface. Also note that, in this embodiment, the outer dimensions of the mounting plate (2) fit in the interior of the receiving portion (8) of the bracket (1) in hand-in-glove fashion. The length of the set screw (3) is about equal to the width of the bracket (1), such that when fully inserted, the set screw (3) joins the peg (6) with both sides of the bracket (1). and the set screw (3) has no protruding surfaces. Moreover, in this particular embodiment, the screw bore (9) is placed close to the opening (10) for the tube, such that when the shade tubes are inserted into the fastening device, the screw bore is hidden from view by the shade. Once this fastening device is mounted on the flat surface, the outer circumference (13) is visible from the side view; the mounting plate (2) being obscured from view. A perspective view of the embodiment affixed to a horizontal, flat surface, is shown in FIG. 3, which demonstrates that the mounting plate (2) is no longer visible once the bracket (1) is in place and secured with the set screw (3). See also FIG. 9.

Figure 4A:
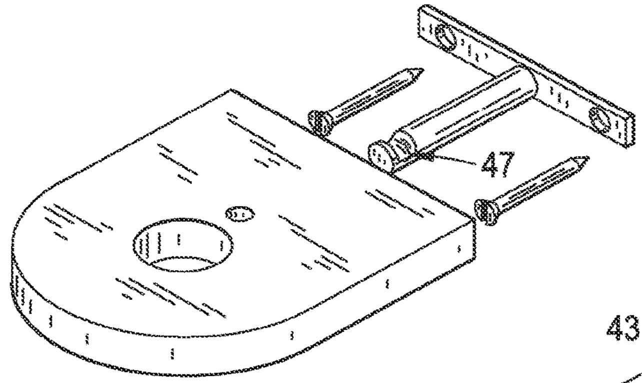
FIGS. 4A-C are three configurations of an embodiment of the bracket, mounting plate, and set screw embodiment, wherein the bracket is further configured as a Coupler, a Wall Mount Idler, or a Motor Wall Mount, respectively.
Figure 4B:
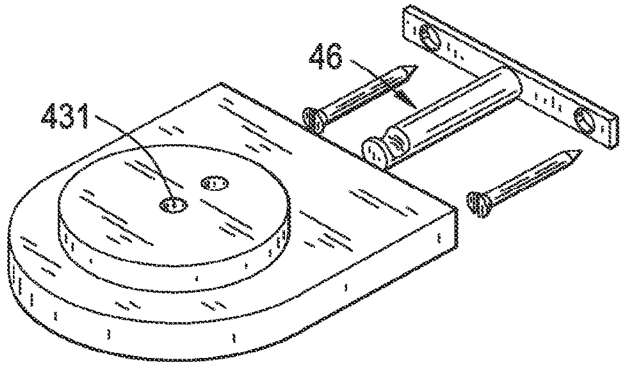
Figure 4C:
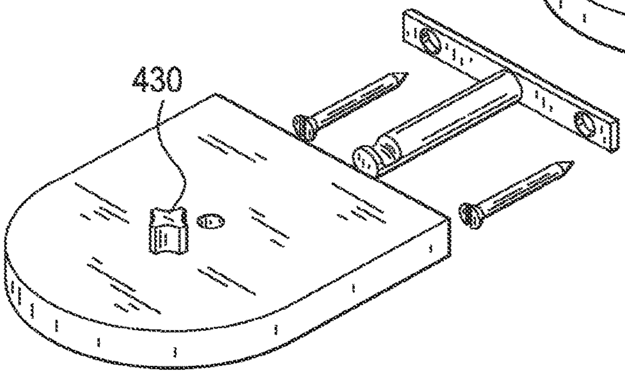

FIGS. 4A-4C present three embodiments of the fastening device, in which the brackets have been configured to serve as a Coupler (see FIGS. 1-3); or as a mount for the motor side of a motorized shade tube (Motor Wall Mount); or as a mount for the end of the tube opposite the motor (Wall Mount Idler). More specifically, the Motor Wall Mount includes a "keying portion" or "key" (430) that, in use, provides a structure against which the motor can torque. The Wall Mount Idler has a hole (431) into which an idler pin can fit. The means connecting the bracket to the mounting plate in these embodiments comprises a rod (46) that projects into the bracket, the rod including a groove (47) that receives a set screw. Alternatively, the rod can be configured as a pin to receive a set screw configured as a cam (i.e., a pin and cam or "knock down" assembly).

Figure 5:
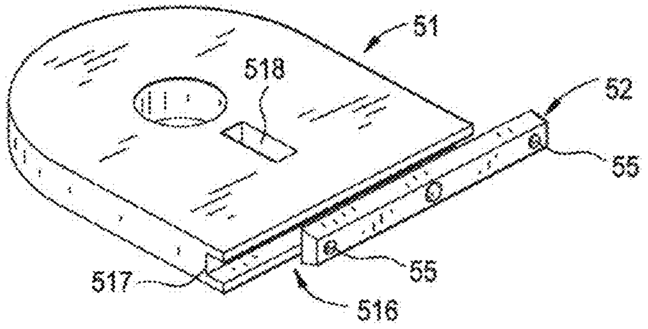
FIG. 5 presents a view of an alternative embodiment of the invention, in which the mounting plate slides into and is hidden within the bracket.
Figure 6A:
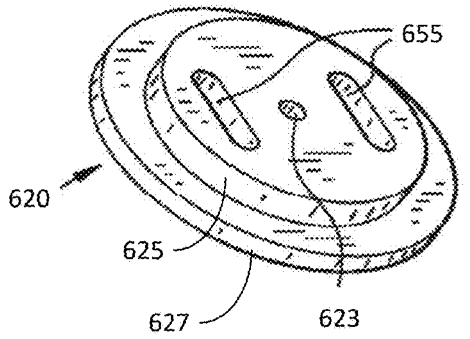
FIGS. 6A-D show various views of a one-piece idler mount disk-shaped mounting bracket.
Figure 6B:
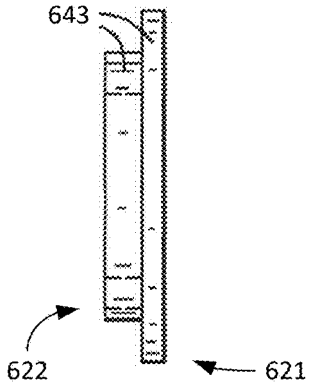
Figure 6C:
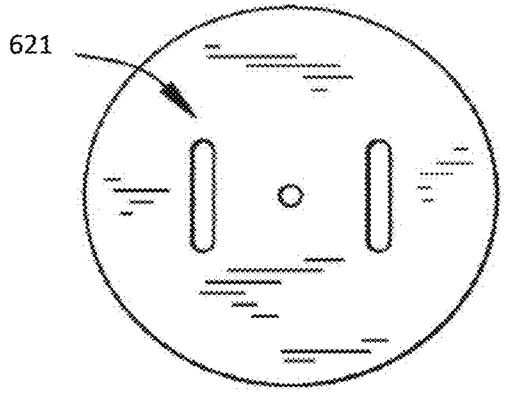
Figure 6D:
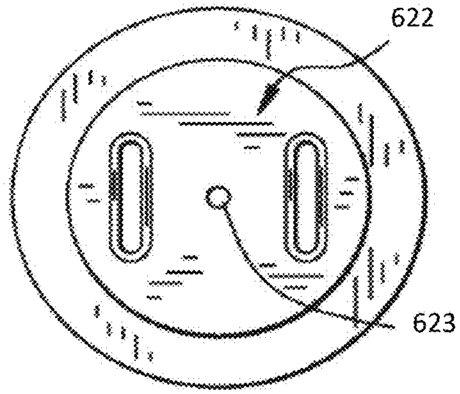
Figure 7A:
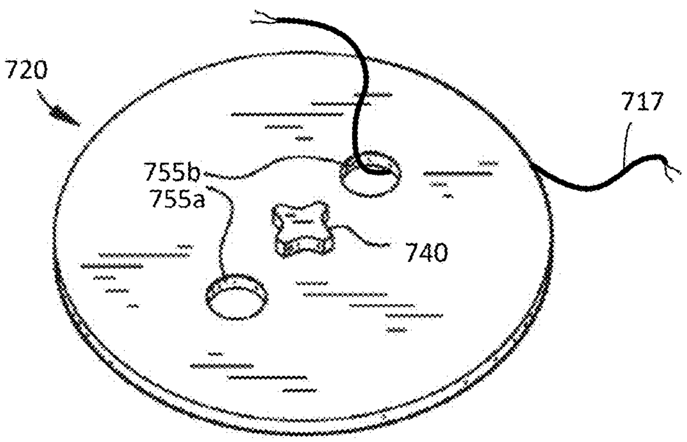
FIGS. 7A-D show various views of a one-piece motor mount disk-shaped mounting bracket.
Figure 7B:
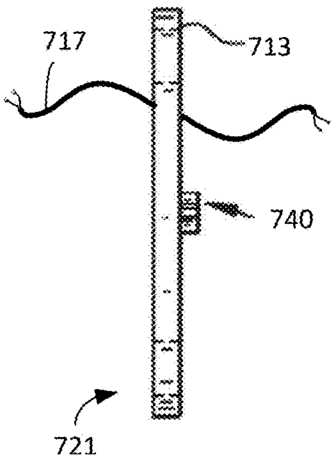
Figure 7C:
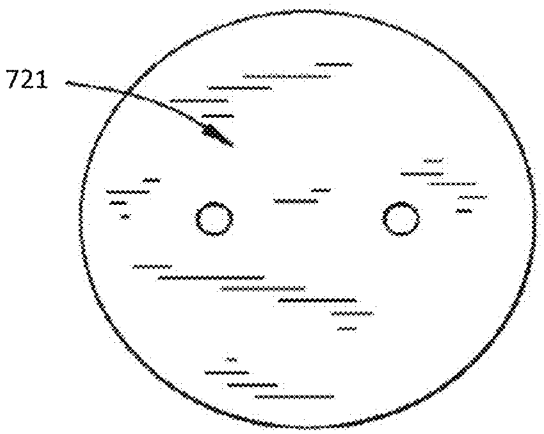
Figure 7D:
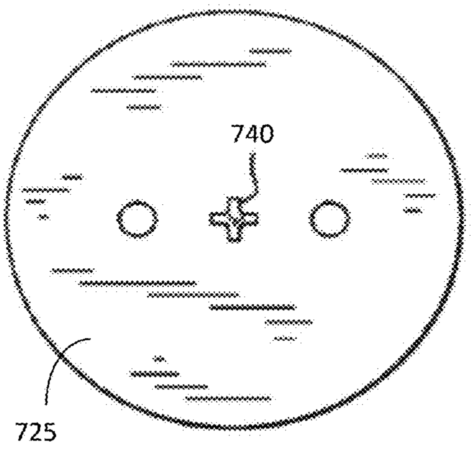
Figure 8:
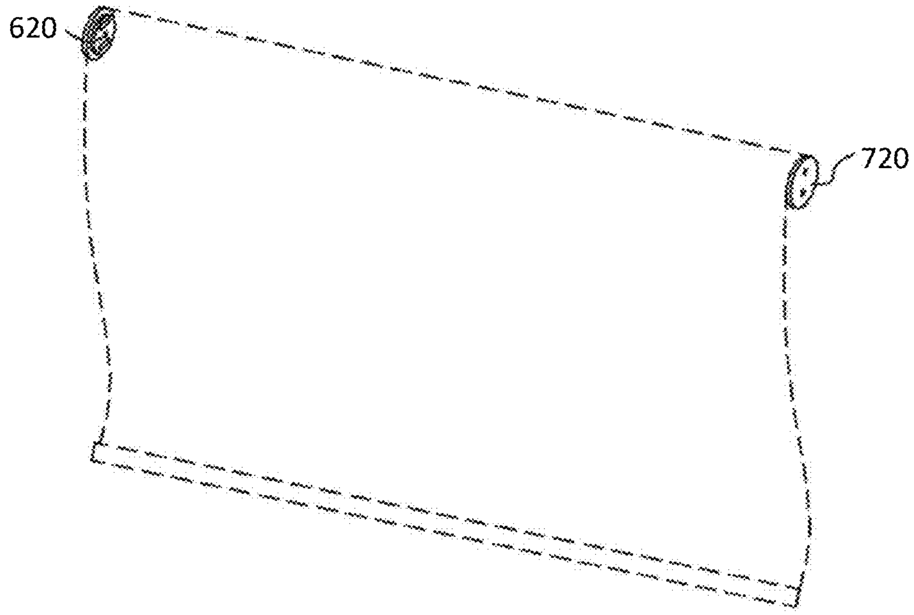
FIG. 8 shows the mounting brackets of FIG. 6 and FIG. 7 in use on a shade, depicted by dashed lines.

FIG. 5 presents an alternative fastening device in which the bracket (51) slides over the mounting plate (52). More specifically, mounting plate (52) has two apertures (55) through which means are inserted to secure the mounting plate (52) to a flat surface. The mounting plate (52) is configured to have flanged portion (516) that fits the complementary base (517) of the bracket (51). Thus, in use, after the mounting plate (52) is secured to a flat surface, the bracket (51) slides over the mounting plate (52) and hides it from view. The bracket (51) is further secured by a fastening means inserted through the slot (518).

The fastening device comprising a bracket that covers the mounting plate provides an aesthetically pleasing mount, in that the means securing the bracket to the structure arc invisible. Moreover, this device can be secured to vertical or horizontal spaces, thus providing elegant flexibility in window shade installations.

Another embodiment of the invention provides for a fastening device system for securing a motorized shade, in which the mounting bracket can be a circulate bracket (620 and 720) for each end of the shade tube is a single piece rather than a mount and bracket assembly. More specifically, FIG. 6 shows views of an idler mount disk-shaped mounting bracket (620) having one side (621) configured to bear against a flat surface and one side having a projection (622) having a bore (623) configured to receive an idler pin. The idler mount (620) further comprises two apertures (655) through which fastening means (e.g., screws) are inserted to secure the flat surface of the idler mount (620) to the appropriate flat surface wall, window casing, etc. The apertures (655) are configured (i.e., recessed) such that, in use, the means affixing the mount to the wall (or casing, etc.) are not visible. Hence, in use, the outer circumference (613) of the idler mount is visible. See also FIG. 10, FIG. 11. The idler mount can include a inner circumference 625. The inner circumference can have a smaller diameter than an outer circumference 627.

Figure 10:
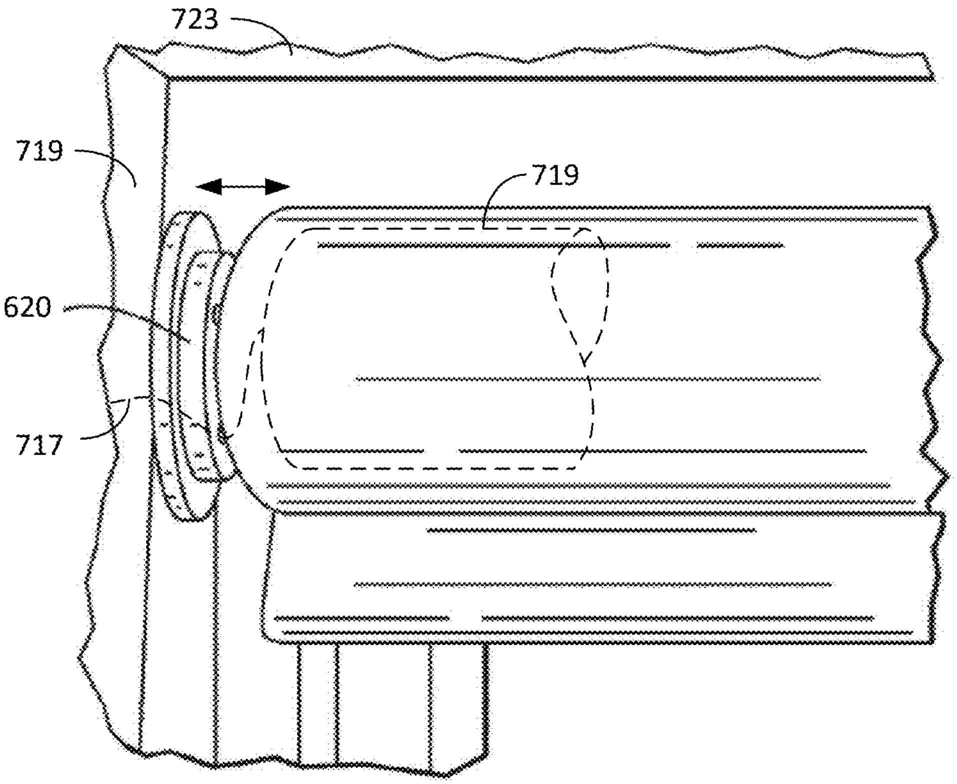
FIG. 10 is a perspective view of a one-piece idler mount disk-shaped mounting bracket installed with a tube shade.

The fastening device system of this embodiment further comprises a motor mount disk-shaped mounting bracket having one side configured to bear against a flat surface and one side having a projection configured as a key to engage the motor. See FIG. 10. More specifically, FIG. 7 shows views of a motor mount disk-shaped mounting bracket (720) having one side (721) configured to bear against a flat surface (e.g., a wall, window casing) and one side (725) having a projection that provides a key (740) against which the shade motor can torque. The circulate bracket can have a first side (721) and a second side (725). Aperture (755*a*) is configured (i.e., recessed) such that, in use, the means affixing the mount to the wall (or casing, etc.) are not visible. Hence, in use, the outer circumference (713) of the motor mount is visible. See also FIG. 11. The circulate bracket can also include a wire aperture (755*b*) adapted to receive a wire. In one embodiment, the aperture can be adapted for mounting the circulate bracket and for receiving a wire. This system is advantageous in window casings or between pillars, where the mounting bracket is secured to a vertical surface. In one embodiment, a wire (717) can extend from a power source to a motor and can enter the first side of the circular bracket wherein the circular bracket is configured to obscure the wire when the circular bracket is coupled to the support surface and the wire extends out the second side. Referring to FIG. 10, the wire 71 can extend from the casing, into the bracket 620, through an opening in the bracket and attach to a motor 719 that can be carried by the window shade. The wire extend from the support surface through the first side, through a portion of the circular bracket and through a second side. The casing can include a side jam (719) and a top jamb (723).

Another embodiment of the invention provides for another fastening device system for securing a motorized shade, in which the mounting bracket for each end of the shade tube is a single piece rather than a mount and bracket assembly. More specifically, FIGS. 12A-E show views of an idler mount (1220). In the embodiment shown in FIGS. 12B-C, the idler mount (1220) has one side (1221) configured to bear against a flat surface and one side having a projection (1222A) having a bore (1223) configured to receive an idler pin. In the embodiment shown in FIGS. 12D-E, the idler mount (1220) has two sides having projections (1222A) and (1222B) having bores (1223) configured to receive an idler pin. The idler mount (1220) further comprises an aperture (1255) through which fastening means (e.g., screws) may be inserted. In one embodiment, the aperture (1255) is recessed so that the fastening means are not visible.

The fastening device system of this embodiment can further comprise a motor mount. More specifically, FIGS. 13A-E show views of a motor mount (1320). In the embodiment shown in FIGS. 13B-C, the motor mount (1320) has one side (1321) configured to bear against a flat surface and one side having a projection (I322A) configured as a key to engage a motor. In the embodiment shown in FIGS. 13D-E, the motor mount (1320) has two sides having projections (1322A) and (1322B). The projections (1322A) and (1322B) provide keys against which shade motors can torque. Motor mount (1320) further comprises an aperture (1355) through which fastening means (e.g., screws) may be inserted. In one embodiment, aperture (1355) is recessed so that the fastening means are not visible.

Figure 17A:
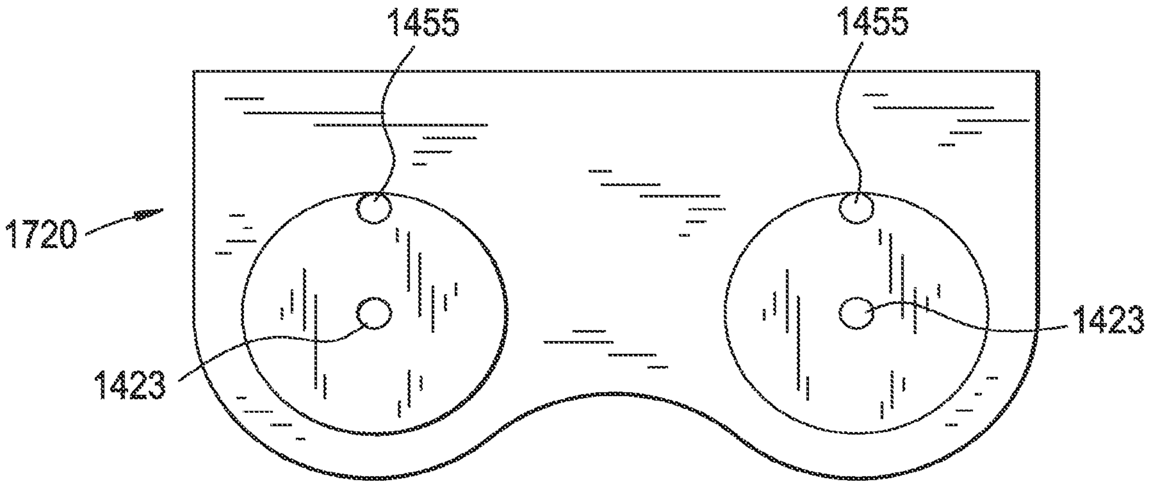
FIGS. 17A-C are top, side and plan views, respectively, of a dual idler mount according to an embodiment.
Figure 17B:
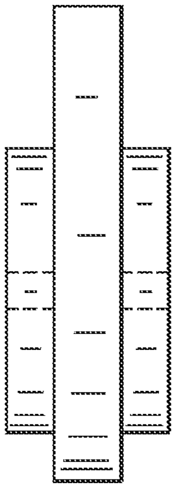
Figure 17C:
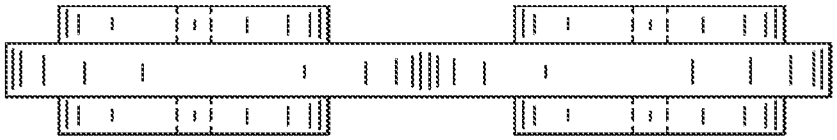

According to one embodiment, dual idler mounts, motor mounts and/or mount and bracket assemblies can be provided for use with two shades. In addition, three or more shades can be fit with a single idler mount, motor mount and/or mount and bracket assembly constructed in a similar fashion as those shown and described above. FIGS. 14A-E and 17A-C show views of dual idler mounts. FIGS. 14A-E show views of an idler mount (1420) in a vertical configuration, while FIGS. 17A-C show views of an idler mount (1720) in a horizontal configuration. In the embodiment shown in FIGS. 14B-C, the idler mount (1420) has one side (1421) configured to bear against a flat surface and one side having two projections (1422A) and (1422B), each having a bore (1423) configured to receive an idler pin. In the embodiment shown in FIGS. 14D-E and 17B-C, the idler mount (1420) has two sides, each having two projections (1422A) and (1422B). Projections (1422A) and (1422B) each have a bore (1423) configured to receive and idler pin. The idler mounts (1420) and (1720) further comprise one or more apertures (1455) through which fastening means (e.g., screws) may be inserted. In one embodiment, the apertures (1455) are recessed so that the fastening means are not visible.

Figure 18A:
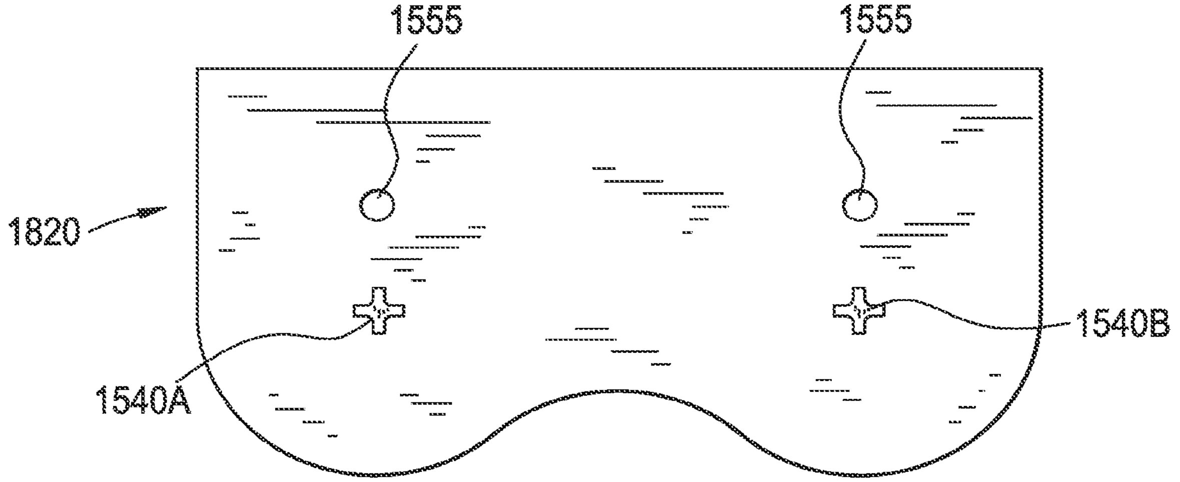
FIGS. 18A-C are top, side and plan views, respectively, of a dual motor mount according to an embodiment.
Figure 18B:
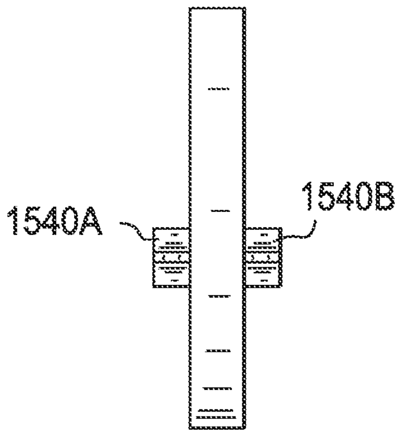
Figure 18C:
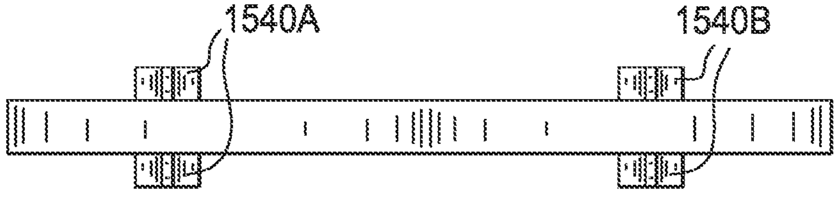

FIGS. 15A-E and 18A-C show views of dual motor mounts. FIGS. 15A-E shows views of a motor mount (1520) in a vertical configuration, while FIGS. 18A-C show views of a motor mount (1820) in a horizontal configuration. In the embodiment shown in FIGS. 15B-C the motor mount (1520) has one side (1521) configured to bear against a flat surface and one side having projections (1540A) and (1540B) configured as keys to engage a motor. In the embodiment shown in FIGS. 150-E, the motor mount (1520) has two sides having projections (1540A) and (1540B). The projections (1540A) and (1540B) provide keys against which shade motors can torque. Motor mounts (1520) and (1820) further comprise one or more apertures (1555) through which fastening means (e.g., screws) may be inserted. In one embodiment, apertures (1555) are recessed so the fastening means are not visible.

Figure 16A:
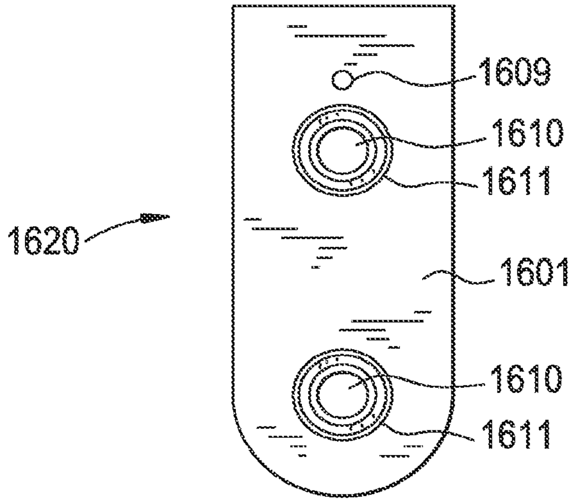
FIGS. 16A-C are top, side and plan views, respectively, of a fastening device according to an embodiment.
Figure 16B:
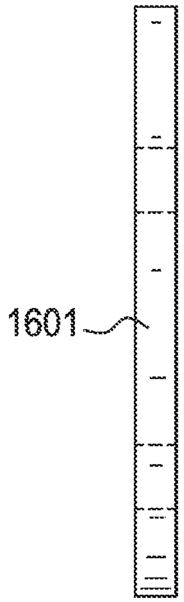
Figure 16C:
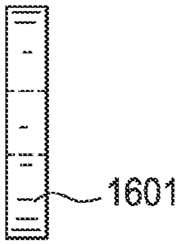
Figure 19A:
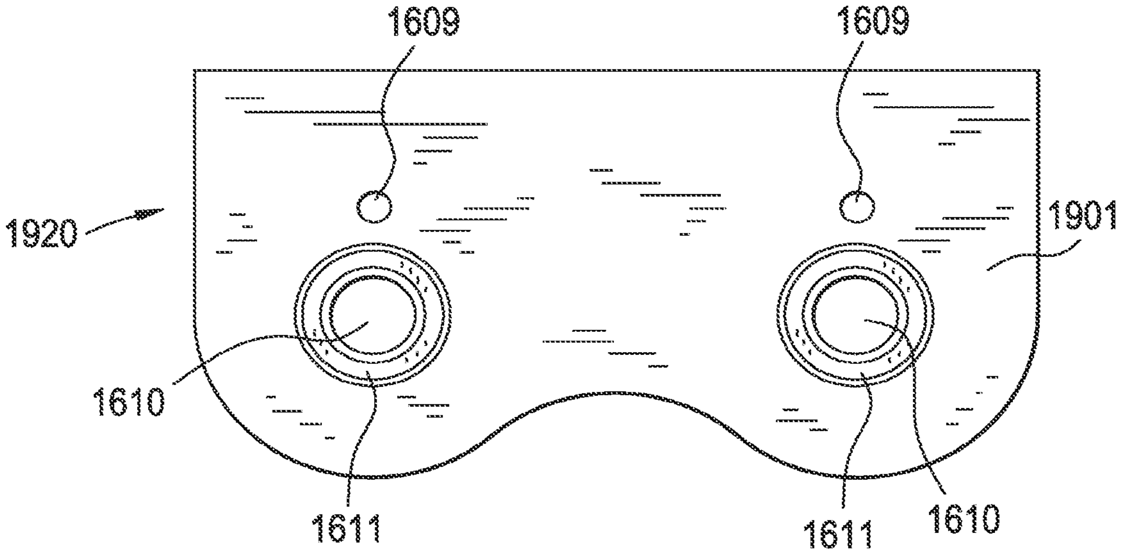
FIGS. 19A-C are top, side and plan views, respectively, of a fastening device according to an embodiment.
Figure 19B:
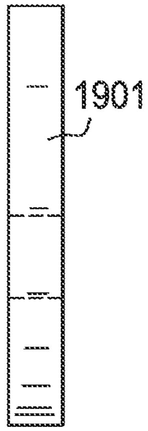
Figure 19C:
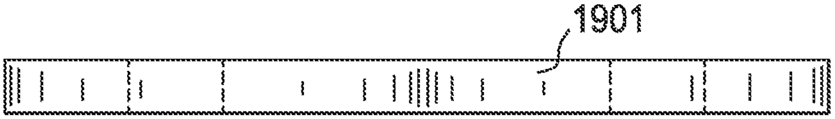

FIGS. 16A-C and 19A-C show views of dual mount and bracket assemblies for securing window shades to a desired surface. FIGS. 16A-C show views of a mount and bracket assembly (1620) in a vertical configuration, while FIGS. 19A-C show views of a mount and bracket assembly (1920) in a horizontal configuration. Assemblies (1620) and (1920) include brackets (1601) and (1901), respectively, and mounting plates (not shown) within brackets (1601) and (1901) similar to mounting plate 2 of FIG. 1. Brackets (1601) and (1901) are configured with openings to receive the mounting plates and are configured to abut a flat surface. Brackets (1601) and (1901) bear one or more screw bores (1609) that pass through the entire body (i.e., width) of the bracket, for receiving a set screw through a corresponding screw bore in the mounting plate. Brackets (1601) and (1901) have openings (1610) for receiving one end of each of two opposing shade tubes, which tubes may interlock within the opening (1610). Each opening (1610) has a bearing (1611), which allows the tubes to spin freely, minimizing friction and wear.

Figure 20:
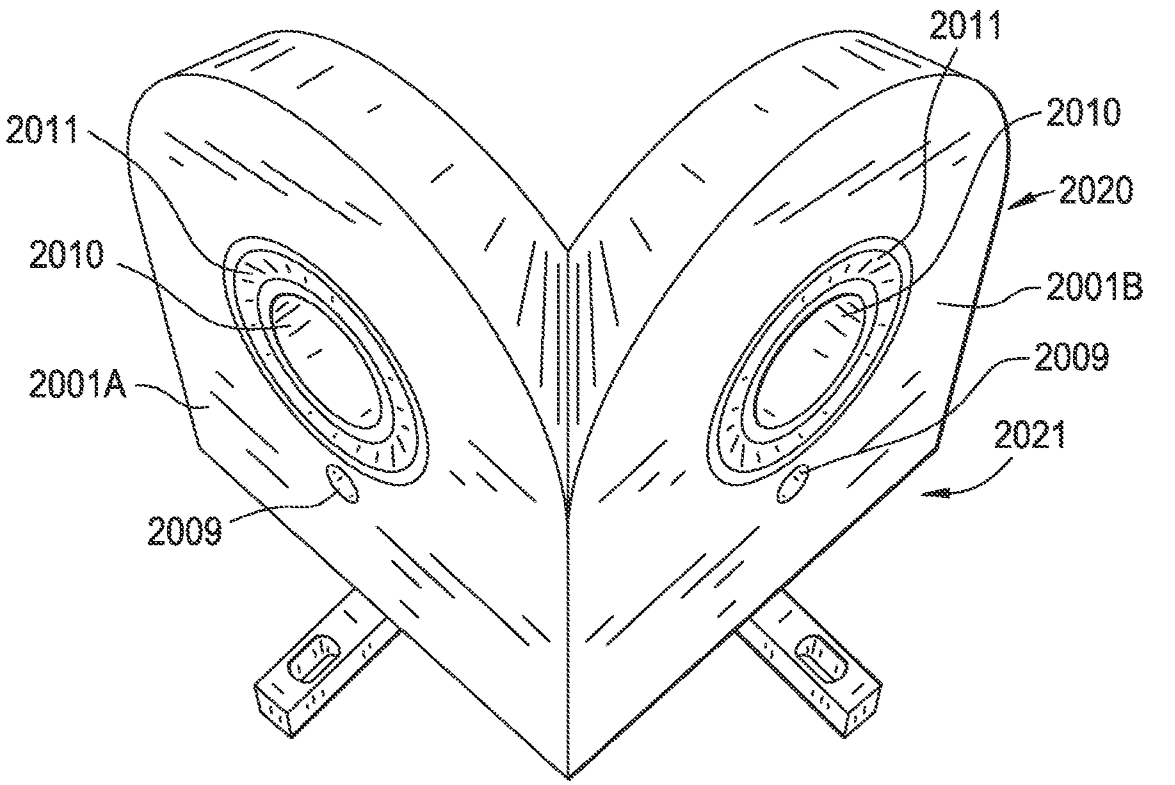
FIG. 20 is a perspective view of a fastening device having brackets position at a 90 degree angle with respect to each other according to an embodiment.

FIG. 20 is a perspective view of still another dual mount and bracket assembly for securing window shades to a desired surface. In this embodiment, assembly (2020) comprises brackets (2001A) and (2001B), which are formed at a 90-degree angle with respect to each other for positioning in a corner, for example. Assembly (2020) further comprises mounting plates (not shown) within each of brackets (2001A) and (2001B), in a similar fashion as is shown and described with respect to mounting plate 2 of FIG. 1. Brackets (2001A) and (2001B) are configured with openings to receive the mounting plates and are configured to abut a flat surface (2021). Brackets (2001A) and (2001B) each bear a screw bore (2009) that passes through the entire body (i.e., width) of the bracket, for receiving a set screw through a corresponding screw bore in the mounting plate. Brackets (2001A) and (2001B) each have an opening (2010) for receiving one end of a shade tube. The shade tube may interlock within the openings (2010). Each opening (2010) has a bearing (2011), which allows the tube to spin freely, minimizing friction.

Figure 21:
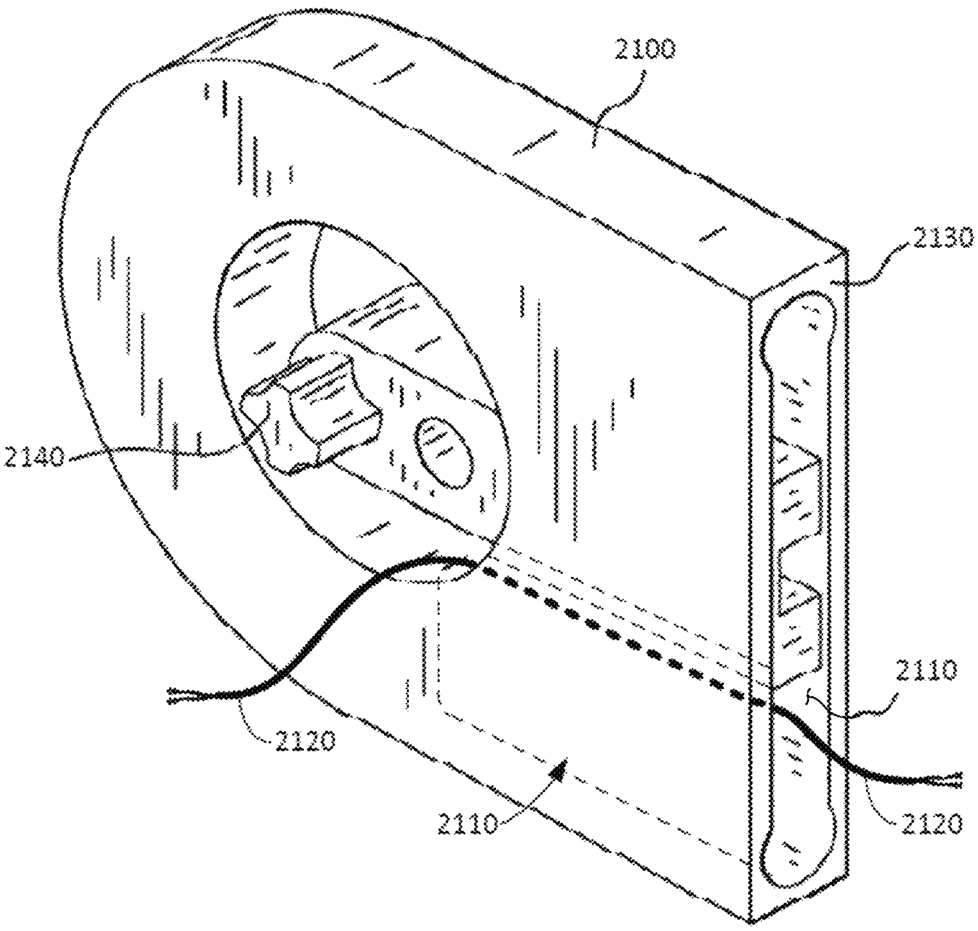
FIG. 21 is a perspective view of a bracket having an opening therethrough according to an embodiment.

FIG. 21 is a perspective view of a bracket (2100) having an opening therethrough according to an embodiment. In some embodiments, the bracket (2100) can have an opening (2110) for a wiring (2120), and the opening (2110) can extend from a side (2130) of the bracket (2100) adapted to bear against a flat surface (such as a wall, not illustrated) to an area (2140) of the bracket adjacent to the roller window shade (not illustrated) to permit the wiring (2120) to pass from the flat surface through the opening in the bracket (2100) and to the roller window shade. As such, the bracket (2100) obscures the view of the wiring (2120). The wiring can, in some embodiments, be used to supply power to a motor for use with the roller window shade. The opening in the bracket for the wiring is not limited to the configuration shown in FIG. 21, and can be provided in any bracket for mounting a window shade.

Figure 22:
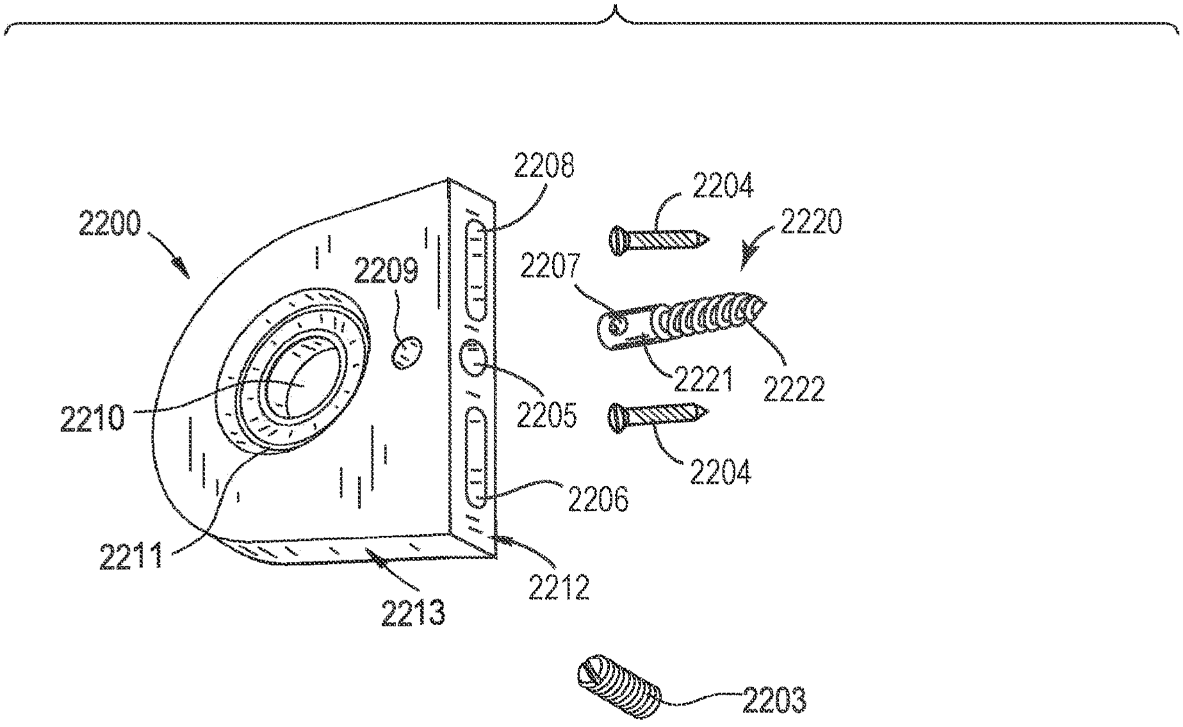
FIG. 22 is a view of a fastening device including a bracket, a mount, a set screw, and two retaining screws, according to an example embodiment.

Referring now to FIG. 22, a view of a fastening device including a bracket (2200), a mount (2220), a set screw (2203), a first retaining screw (2204) and a second retaining screw (2204) is shown according to an example embodiment. The mount (2220) may be a fastener (e.g., such as a bolt) that can be secured to a surface (e.g., such as a wall, ceiling, cabinetry). For example, the mount (2220) may be a threaded rod where a portion of the rod or all of the rod is threaded, a threaded sleeve with a set screw, and so on. The mount (2220) may be any type of fastener configured to be secured to any type of surface, including wood, metal, ceramic, drywall, brick, concreate, and other surface types. In some embodiments, as shown in FIG. 22, the mount (2220) includes a protrusion (2221) having a bore (2207) and a threaded portion (2222). For example, the mount (2220) may be fastened to a surface by screwing the threaded portion (2222) into the surface. In some embodiments, the mount (2220) does not include the threaded portion (2222) and is secured to a surface by another method (e.g., glue, welding). When the threaded portion (2222) is secured to a surface, one end of the protrusion (2221) may abut the surface such that the protrusion (2221) remains protruding from the surface. The bracket (2200) includes a first aperture (2206), a second aperture (2208), and a third aperture (2205).

Figure 23:
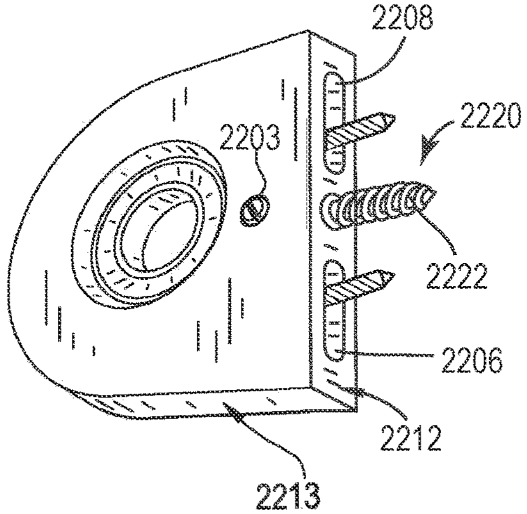
FIG. 23 is a view of the fastening device of FIG. 22 in an installed position with the bracket fitting over the mount and retaining screws, and the set screw inserted partially into the bracket.

As shown in FIG. 23, when the fastening device is in an installed position, the first aperture (2206) receives the first retaining screw (2204), the second aperture (2208) receives the second retaining screw (2204), and the third aperture (2205) receives the protrusion (2221) of the mount (2220) so that the bore (2207) of the mount (2220) aligns with a bore (2209) of the bracket (2200). When the bores (2207, 2209) align, the set screw (2203) may be inserted into the bores (2207, 2209) to removably secure the bracket (2200) to the mount (2220). The length of the set screw (2203) may be about equal to the width of the bracket (2200), such that when fully inserted, the set screw (2203) joins the protrusion (2220) with both sides of the bracket (2200) and the set screw (2203) has no protruding surfaces. The bracket (2220) has an end (2212) configured to abut the installation surface. As shown in FIGS. 22 and 23, the end (2212) is shown as being flat for abutting a flat or substantially flat surface, though it will be appreciated that the end (2212) may be shaped to fit an installation surface having any type of shape. Once the bracket (2200) is installed, an outer circumference (2213) of the bracket (2200) may be visible to an observer from a side view, but the mount (2220) is obscured by the bracket (2200). In the particular embodiment shown in FIG. 22, the bracket has an opening (2210) for receiving one end of each of two opposing shade tubes, though other types of shade tube connectors may be used. The shade tubes may interlock within the opening (2210). The particular embodiment shown also has a bearing (2211) within the opening (2210), which allows the tubes to spin freely, thereby minimizing friction and wear.

Figure 11:
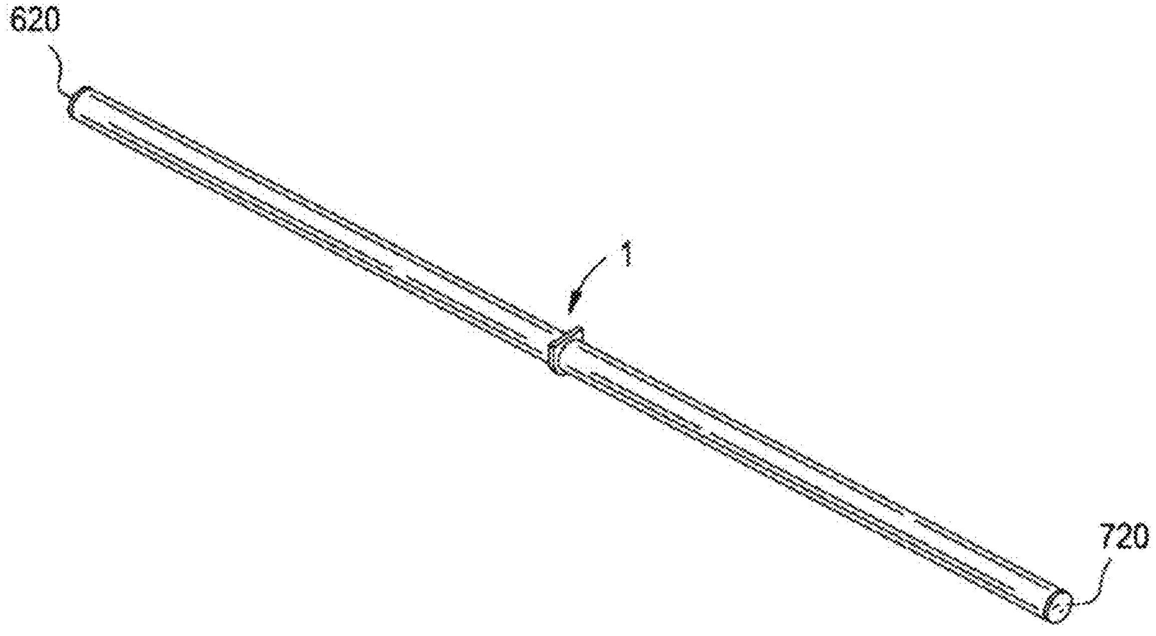
FIG. 11 is a depiction of two tube shades assembled with the fastening devices of some embodiments of the present invention.
Figure 12A:
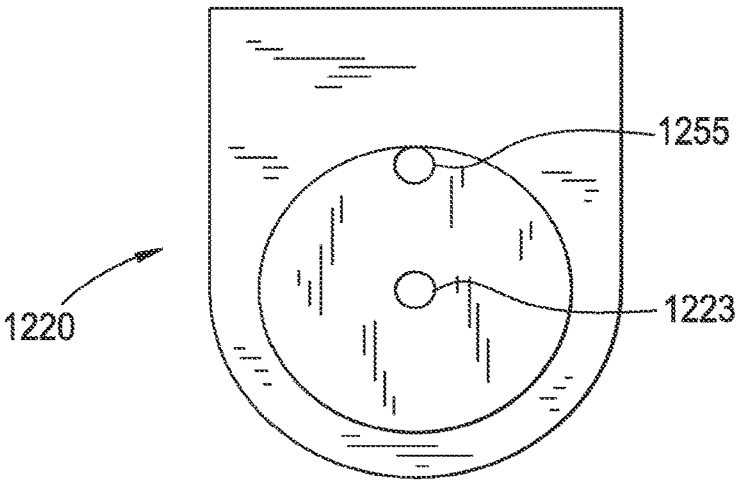
FIG. 12A is a top view of an idler mount according to an embodiment.
Figure 12B:
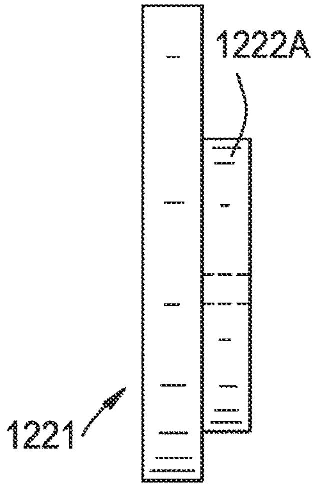
FIGS. 12B-C are side and plan views, respectively, of the idler mount of FIG. 12A according to an embodiment.
Figure 12C:
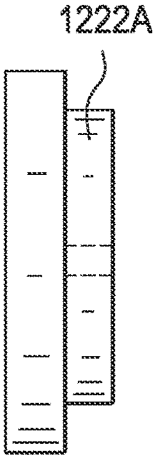
Figure 12D:
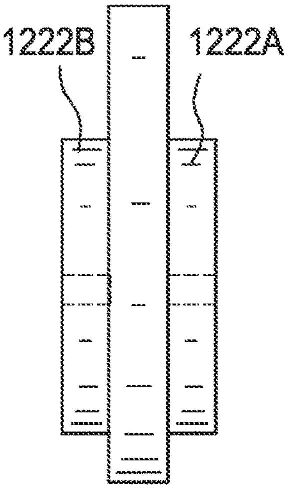
FIGS. 12D-E are side and plan views, respectively, of the idler mount of FIG. 12A according to another embodiment.
Figure 12E:
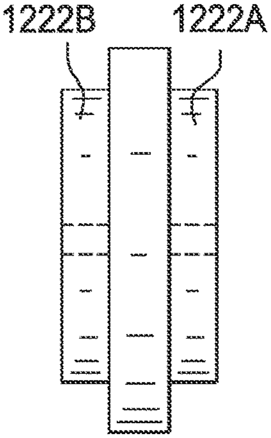
Figure 13A:
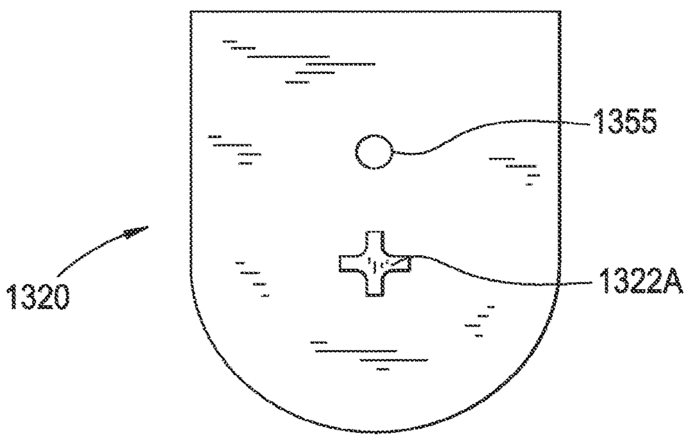
FIG. 13A is a top view of a motor mount according to an embodiment.
Figures 13B, 13C, 13D, 13E:
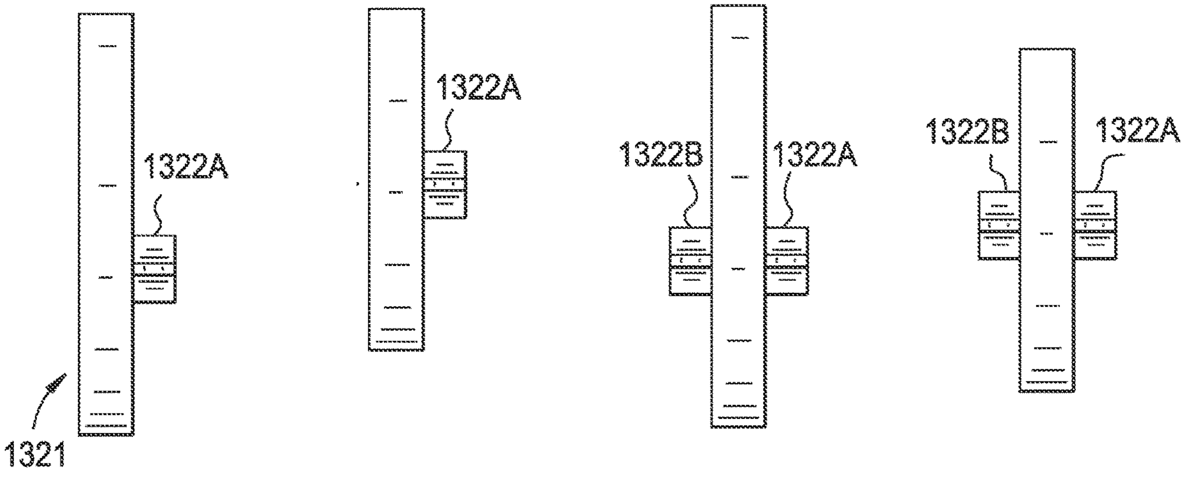
FIGS. 13B-C are side and plan views, respectively, of the motor mount of FIG. 13A according to an embodiment.
FIGS. 13D-E are side and plan views, respectively, of the motor mount of FIG. 13A according to another embodiment.
Figure 14A:
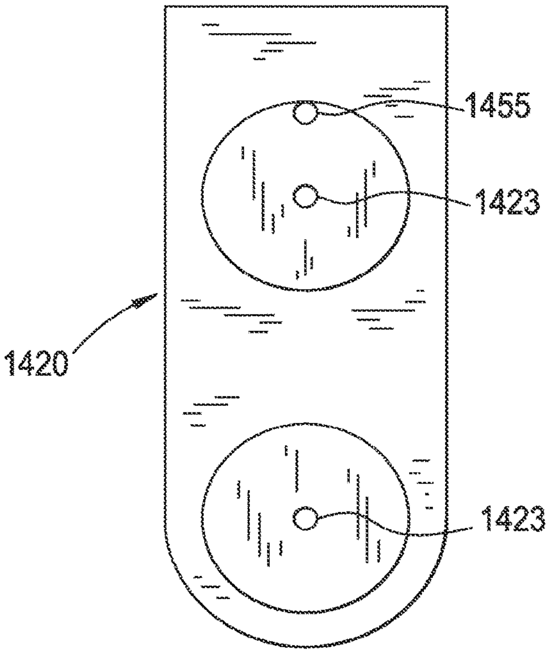
FIG. 14A is a top view of a dual idler mount according to an embodiment.
Figure 14B:
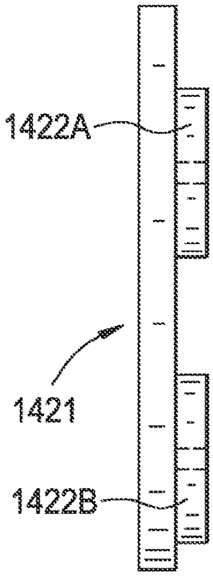
FIGS. 14B-C are side and plan views, respectively, of the dual idler mount of FIG. 14A according to an embodiment.
Figure 14C:
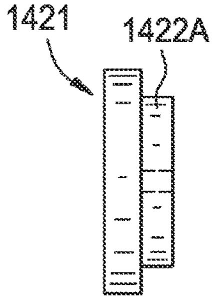
Figure 14D:
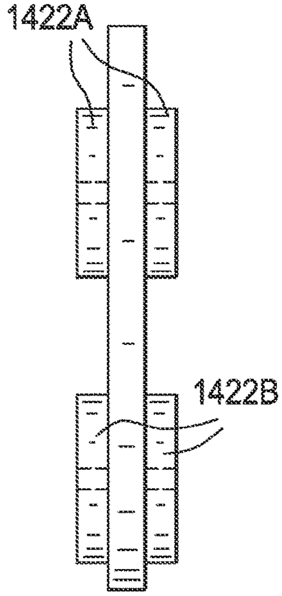
FIGS. 14D-E are side and plan views, respectively, of the dual idler mount of FIG. 14A according to another embodiment.
Figure 14E:
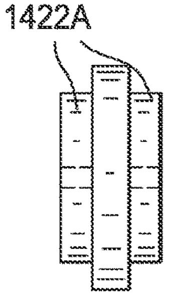
Figure 15A:
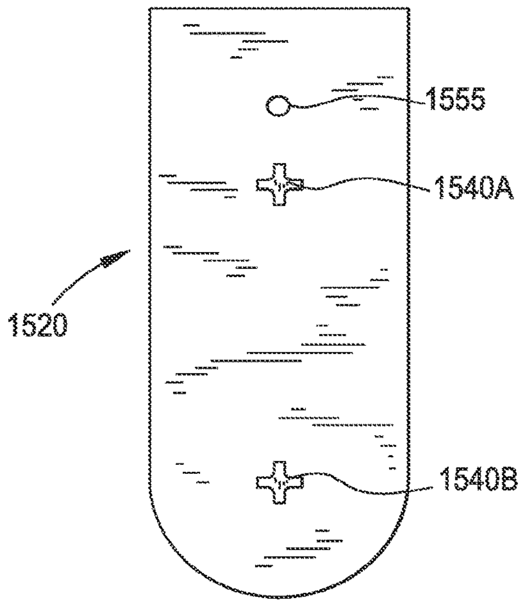
FIG. 15A is a top view of a dual motor mount according to an embodiment.
Figure 15B:
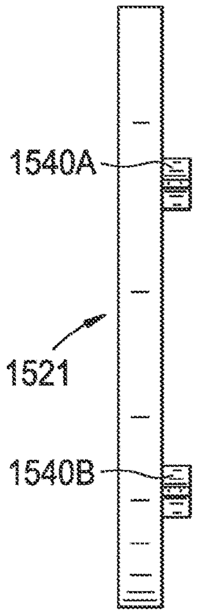
FIGS. 15B-C are side and plan views, respectively, of the dual motor mount of FIG. 15A according to an embodiment.
Figure 15C:
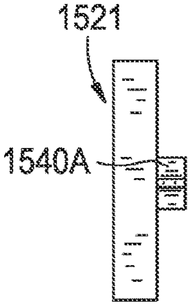
Figure 15D:
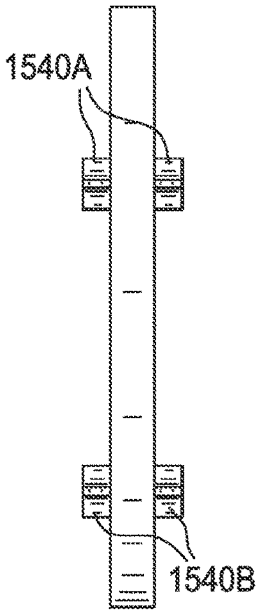
FIGS. 15D-E are side and plan views, respectively, of the dual motor mount of FIG. 15A according to another embodiment.
Figure 15E:
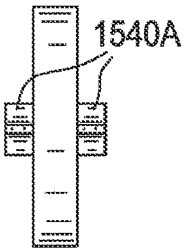

A further embodiment of the present invention provides for a fastening device system comprising the single-piece, disk shaped idler and motor mounts and the fastening device comprising the mounting plate and bracket. As shown in FIG. 11, this system is useful when using two shade tubes, with the motor mount and idler mount at the outer ends of the two shades, and the fastening device configured as a coupler in between, maintain the connection of the two shades in communication with the motor. This embodiment can be adapted to secure a number of shades, by using the required number of coupler fastening devices.

In use, low voltage wiring is done behind the motor mounting bracket or motor bracket/mounting plate fastening device. A wire is brought through the window casing (or appropriate structure), then the mount or bracket located adjacent to the wire. The wire is strung to behind the far (hidden) corner of the bracket and connections made behind the bracket such that the wiring is covered by the bracket.

The fastening devices and systems of the present embodiments are also suitable for use with non-motorized window shades; the particular embodiment selected to complement the structure at the ends of the non-motorized shade tubes.

When the disk-shaped mounting brackets are installed in a window casing, there is little room for error because the disk is relatively thin. Hence, installers can use mock shade tubes to perfect the installation, then order shades to match the tube length. Once the shades arrive, the mock tubes are removed from the motor, the motor and idler are installed in the shade, and the installation completed.

What is claimed is:

1. A roller shade mounting element comprising:

a circular bracket configured to support a roller window shade assembly;

a first side included in the circular bracket and configured to bear against a support surface such that the circular bracket extends away from the support surface and is adjacent an end of the roller window shade assembly;

a second side included in the bracket having a first surface carried by the second side configured to support an end of the roller window shade assembly;

a wire extending through a wire aperture defined in the circular bracket from entering the first side to an area of the circular bracket adjacent the end of the roller window shade assembly wherein the circular bracket is configured to obscure the wire when the circular bracket is coupled to the support surface and supports the roller window shade assembly and the wire extends out the second side;

a contiguous outer circumference of the circular bracket is visible to an observer when the circular bracket bears against the support surface and supports the roller window shade assembly, and;

an inner circumference included in the circular bracket.

2. The roller shade mounting element of claim 1 wherein the aperture is configured to receive a fastener to couple the first side to the support surface.

3. The roller shade mounting element of claim 1 wherein the inner circumference recessed and visible to the observer when the circular bracket bears against the support surface and supports the roller window shade assembly.

4. The roller shade mounting element of claim 3 wherein the inner circumference is smaller than the outer circumference.

5. The roller shade mounting element of claim 1 wherein the outer circumference is adjacent to the support surface.

6. The roller shade mounting element of claim 1 including a surface included in the circular bracket opposite the first side and carrying an inner circumference.

7. The roller shade mounting element of claim 1 wherein the wire extends from the support surface, through the circular bracket and into a motor included in the roller window shade assembly.

8. The roller shade mounting element of claim 1 wherein the support surface is window casing.

9. The roller shade mounting element of claim 1 wherein the support surface is a side jamb.

10. A roller shade mounting element comprising:

a circular bracket having a first side configured to couple to a support surface and configured to support a roller window shade assembly;

a first surface carried by the first side configured to bear against the support surface;

a second side included in the circular bracket substantially opposite the first side configured to support an end of the roller window shade assembly;

a wire extending from the support surface through the first side, through a portion of the circular bracket and through the second side wherein the circular bracket wherein the circular bracket obscures the wire from view and, an inner circumference included in the circular bracket visible in a recess when the circulate bracket supports the roller window shade assembly.

11. The roller shade mounting element of claim 10 including an outer circumference included in the circular bracket visible to an observer when the circular bracket bears against the support surface and supports the roller window shade assembly.

12. The roller shade mounting element of claim 10 wherein the combination of the circular bracket and the roller window shade assembly obscures the wire to an observer.

13. The roller shade mounting element of claim 10 including an outer circumference included in the circular bracket and visible to an observer when the circular bracket bears against the support surface and supports the roller window shade assembly.

14. The roller shade mounting element of claim 10 wherein the support surface is a window casing.

15. The roller shade mounting element of claim 10 wherein the support surface is a side jamb.

16. A roller shade mounting system comprising:

a first circular bracket having a first side wherein the first side is configured to bear against a first support surface;

a second side included in the circular bracket substantially opposite the first side and configured to carry a first end of a roller window shade assembly;

a surface between the first side and the second side;

a wire entering the first side, through the second side and to the roller window shade assembly and obscured by the circular bracket and the roller window shade assembly when the roller window shade assembly is supported by the circular bracket; and, a second circular bracket having a flat end configured to bear against a second support surface wherein the second circular bracket is configured to support a second end of the roller window shade assembly.

17. The roller shade mounting system of claim 16 wherein the first support surface is a side jamb.

18. The roller shade mounting system of claim 16 wherein the second support surface is a top jamb.

19. The roller shade mounting system of claim 16 wherein the wire extends through an aperture defined in the circular bracket.

* * * * *